United States Patent
Hsu et al.

(10) Patent No.: US 12,529,612 B2
(45) Date of Patent: Jan. 20, 2026

(54) PRESSURE SENSOR, PRESSURE-SENSITIVE CIRCUIT BOARD, AND MANUFACTURING METHOD FOR PRESSURE-SENSITIVE CIRCUIT BOARD

(71) Applicants: Avary Holding (Shenzhen) Co., Limited., Shenzhen (CN); QING DING PRECISION ELECTRONICS (HUAIAN) CO., LTD, Huai an (CN)

(72) Inventors: Hsiao-Ting Hsu, New Taipei (TW); Fu-Yun Shen, Shenzhen (CN); Ming-Jaan Ho, New Taipei (TW)

(73) Assignees: Avary Holding (Shenzhen) Co., Limited., Shenzhen (CN); QING DING PRECISION ELECTRONICS (HUAIAN) CO., LTD, Huai an (CN)

( * ) Notice: Subject to any disclaimer, the term of this patent is extended or adjusted under 35 U.S.C. 154(b) by 403 days.

(21) Appl. No.: 18/037,306

(22) PCT Filed: Jun. 24, 2021

(86) PCT No.: PCT/CN2021/102214
§ 371 (c)(1),
(2) Date: May 16, 2023

(87) PCT Pub. No.: WO2022/266972
PCT Pub. Date: Dec. 29, 2022

(65) Prior Publication Data
US 2023/0408349 A1    Dec. 21, 2023

(51) Int. Cl.
*G01L 1/00* (2006.01)
*G01L 1/22* (2006.01)

(52) U.S. Cl.
CPC ................ *G01L 1/2287* (2013.01)

(58) Field of Classification Search
CPC ..................................... G01L 1/2287
See application file for complete search history.

(56) References Cited

U.S. PATENT DOCUMENTS 10,007,380 B2 *   6/2018   Yoon ............... G06F 3/04166

FOREIGN PATENT DOCUMENTS

CN      108885147 A  *  11/2018  ......... G06F 3/045
JP      2012163348 A  *  8/2012

* cited by examiner

*Primary Examiner* — John E Breene
(74) *Attorney, Agent, or Firm* — ScienBiziP, P.C.

(57) ABSTRACT

The present application provides a pressure-sensitive circuit board, including a circuit substrate, a number of conductive convex blocks, and a strain member. The circuit substrate includes a dielectric layer and a conductive wiring layer on the dielectric layer. The conductive convex blocks are spaced from each other on the conductive wiring layer. A receiving space is defined between adjacent conductive convex blocks. The strain member is formed on the conductive convex blocks and covers the receiving space. The strain member can be deformed under an external force. The receiving space can receive at least a portion of the strain member. The present application further provides a manufacturing method for the pressure-sensitive circuit board. The present application further provides a pressure sensor.

20 Claims, 14 Drawing Sheets

PRESSURE SENSOR, PRESSURE-SENSITIVE CIRCUIT BOARD, AND MANUFACTURING METHOD FOR PRESSURE-SENSITIVE CIRCUIT BOARD

FIELD

The subject matter herein generally relates to a pressure sensor, a pressure-sensitive circuit board, and a manufacturing method for the pressure-sensitive circuit board.

BACKGROUND

With the development of intelligent life, intelligent devices are widely used in various fields, such as communication, medical treatment, automobile, and industrial control. Most of the intelligent devices may have pressure sensors.

An existing pressure sensor mainly include a substrate, a strain material, and a support body. The support body is arranged between the substrate and strain material to form a gap between the substrate and strain material. The strain material may elastically deform thereby change the resistance thereof when being pressed. The strain material may be then partially squeezed into the gap. In order to provide sufficient gap to receive the deformed strain material, the support body needs to have a large height. However, the support body with a large height often increases a thickness of the pressure sensor, so that the pressure sensor cannot be miniaturized.

SUMMARY

To overcome the above shortcomings, the present application provides a pressure-sensitive circuit board.

In addition, a manufacturing method for the pressure-sensitive circuit board is also needed.

In addition, a pressure sensor having the above pressure-sensitive circuit board is also needed.

The pressure-sensitive circuit board includes a circuit substrate, a plurality of conductive convex blocks, and a strain member. The circuit substrate includes a dielectric layer and a conductive wiring layer formed on the dielectric layer, the plurality of conductive convex blocks is formed on the conductive wiring layer and spaced from each other, and a receiving space is defined between adjacent two of the plurality, of conductive convex blocks. The strain member is formed on the plurality of conductive convex blocks and covers each of the receiving space, the strain member is deformable by an external force, and each of the receiving space is configured to receive at least a portion of the strain member when the stain member is deformed.

Furthermore, the conductive wiring layer comprises a first conductive wiring and a second conductive wiring spaced from the first conductive wiring, the dielectric layer is partially exposed between the first conductive wiring and the second conductive wiring. The plurality of conductive convex blocks includes a plurality of first convex blocks and a plurality of second convex blocks, the plurality of first convex blocks are formed on the first conductive wiring and spaced from each other, the plurality of second convex blocks are formed on the second conductive wiring and spaced from each other; the receiving space includes a first receiving space defined between adjacent two of the plurality of first convex blocks, and a second receiving space defined between adjacent two of the plurality of second convex blocks. The strain member includes a first strain body, a second strain body, and a third strain body, the first strain body is formed on the plurality of first convex blocks and covers each of the first receiving space, the second strain body is formed on the plurality of second convex blocks and covers each of the second receiving space, and the third strain body is formed on the dielectric layer and connects the first strain body to the second strain body.

Furthermore, the conductive wiring layer includes a third conductive wiring and a fourth conductive wiring spaced from the third conductive wiring, the dielectric layer is partially exposed between the third conductive wiring and the fourth conductive wiring. The plurality of conductive convex blocks includes a first conductive body and a second conductive body; the first conductive body includes a first main body and a plurality of third convex blocks protruding from the first main body, the second conductive body includes a second main body and a plurality of fourth convex blocks protruding from the second main body, the first main body is formed on the third conductive wiring, the second main body is formed on the fourth conductive wiring, the receiving space includes a third receiving space defined between adjacent two of the plurality of third convex blocks and a fourth receiving space defined between adjacent two of the plurality of fourth convex blocks. The strain member includes a fourth strain body, a fifth strain body, and a sixth strain body, the fourth strain body is formed on the plurality of third convex blocks and covers each of the third receiving space, the fifth strain body is formed on the plurality of fourth convex blocks and covers each of the fourth receiving space, a portion of the sixth strain body is formed on the dielectric layer, and the sixth strain body connects the fourth strain body to the fifth strain body.

Furthermore, a distance between adjacent two of the plurality of conductive convex blocks is in a range of 18 microns to 30 microns.

Furthermore, the pressure-sensitive circuit board further includes a solder mask formed on the strain member.

Furthermore, the strain member includes conductive particles and an adhesive, the conductive particles comprise at least one of silver nanowires, silver nanopowders, and carbon powders, and the adhesive comprises at least one of polydimethylsiloxane and thermoplastic polyurethane.

Furthermore, the plurality of conductive convex blocks includes metal or a composite of metal and adhesive.

The manufacturing method for the pressure-sensitive circuit board includes providing a circuit substrate, the circuit substrate being provided with a dielectric layer and a conductive wiring layer formed on the dielectric layer; forming a plurality of conductive convex blocks on the conductive wiring layer, a receiving space being defined between adjacent two of the plurality of conductive convex blocks; and forming a strain member on the plurality of conductive convex blocks, causing the strain member to cover each of the receiving space, thereby obtaining the pressure-sensitive circuit board.

Furthermore, the plurality of conductive convex blocks is formed by electroplating or pasting of silver paste.

The pressure sensor includes the pressure-sensitive circuit board mentioned above.

In the present application, the pressure-sensitive circuit board forms a number of receiving spaces by setting a number of conductive convex blocks spaced from each other. The receiving spaces may be used to receive the deformed strain body. That is, deformed strain body may be separately filled in the receiving spaces. Thus, the overall thickness of the pressure-sensitive circuit board may be reduced.

Figure 1:
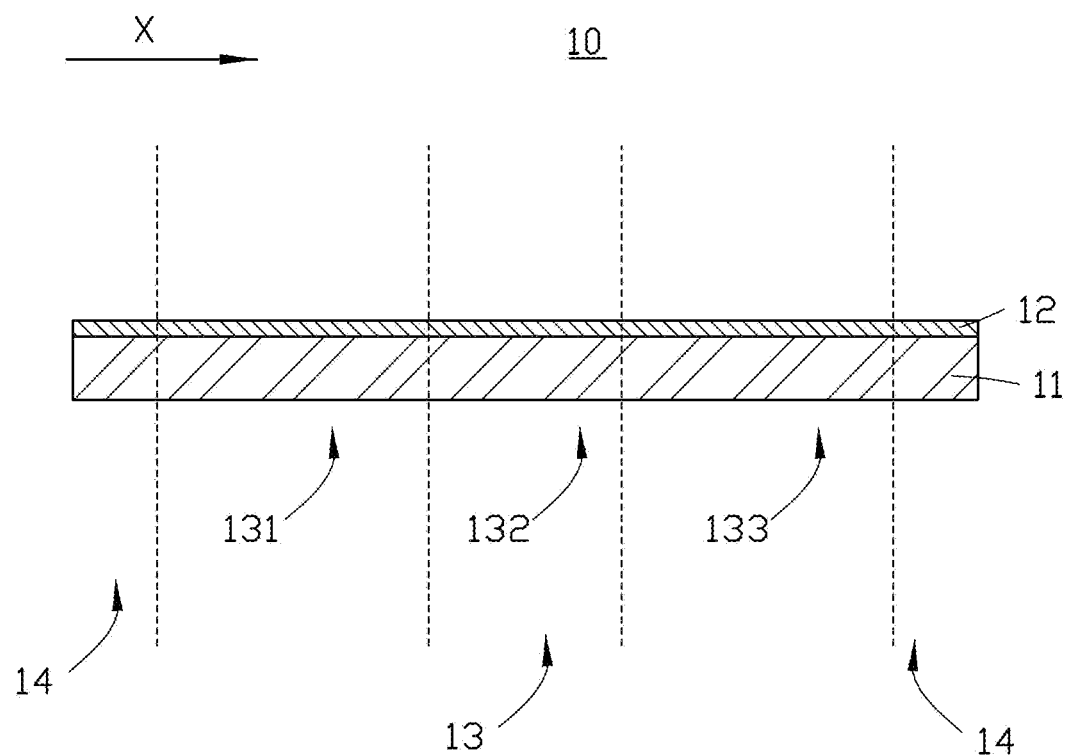
FIG. 1 is a diagrammatic view of a copper-clad substrate according to a first embodiment or a second embodiment of the present application.

NUMERIC OF MAIN COMPONENTS pressure-sensitive circuit board 100 or 200; copper-clad substrate 10; dielectric layer 11; copper foil layer 12; first conductive wiring 121; second conductive wiring 122; third conductive wiring 123; fourth conductive wiring 124; pressing area 13; first pressing area 131; second pressing area 132; third pressing area 133; first convex block 21; second convex block 22; third convex block 23; fourth convex block 24; first strain body 31; second strain body 32; third strain body 33; fourth strain body 34; fifth strain body 35; sixth strain body 36; first solder mask 40; first conductive body 51; first main body 511; second conductive body 52; second main body 521; first receiving space A; second receiving space B; third receiving space C; fourth receiving space D; extending direction X.

Implementations of the present disclosure will now be described, by way of embodiments, with reference to the attached figures.

DETAILED DESCRIPTION

Implementations of the disclosure will now be described, by way of embodiments only, with reference to the drawings. The described embodiments are a portion of the embodiments instead of all embodiments of the present application.

It should be noted that when a component is referred to as being "fixed to" another component, the component can be directly fixed to another component or a middle component may exist therebetween. When a component is considered to be "connected to" another component, the component can be directly connected to another component or a middle component may exist therebetween. When a component is considered to be "formed on" another component, the component can be directly formed on another component or a middle component may exist therebetween.

Referring to FIGS. 1 to 5, a manufacturing method for a pressure-sensitive circuit board 100 is provided according to a first embodiment of the present application, which includes the following steps.

At S1, referring to FIG. 1, a copper-clad substrate 10 is provided. The copper-clad substrate 10 includes a dielectric layer 11 and a copper foil layer 12 formed on the dielectric layer 11. In an extension direction X of the copper-clad substrate 10, the copper-clad substrate 10 is divided into a pressing area 13 and a non-pressing area 14 besides the pressing area 13. The pressing area 13 is divided into a first pressing area 131, a second pressing area 132, and a third pressing area 133 in the extension direction X. The second pressing area 132 is between the first pressing area 131 and the third pressing area 133.

In one embodiment, the dielectric layer 11 may include a rigid or a flexible material. The dielectric layer 11 may include, but is not limited to polyimide (PI), polyethylene terephthalate (PET), polyethylene naphtholate (PEN), liquid crystal polymer (LCP), and modified polyimide (MPI).

In one embodiment, the copper-clad substrate 10 is a single-sided copper-clad substrate, and the copper foil layer 12 is formed on one surface of the dielectric layer 11. In other embodiments, the copper-clad substrate 10 may also be a double-sided copper-clad substrate, which includes two copper foil layers 12 formed on two opposite surfaces of the dielectric layer 11.

In one embodiment, a wiring layer (not shown) may be embedded in the dielectric layer 11. The embedded wiring layer is electrically connected to the copper foil layer 12, so that the final pressure-sensitive circuit board 100 may have a number of wiring layers.

Figure 2:
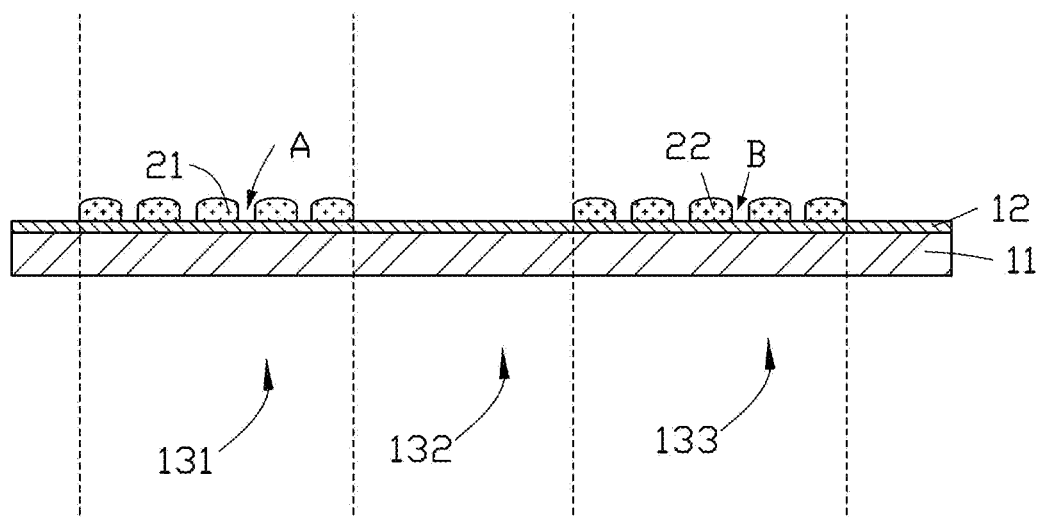
FIG. 2 is a diagrammatic view showing a number of first convex blocks and a number of second convex blocks being formed on the copper-clad substrate of FIG. 1 according to the first embodiment of the present application.

At S2, referring to FIG. 2, a number of first convex blocks 21 are formed on a portion of copper foil layer 12 in the first pressing area 131 by electroplating, and the first convex blocks 21 are spaced from each other. A first receiving space A is defined between two adjacent first convex blocks 21. Furthermore, a number of second convex blocks 22 are formed on a portion of copper foil layer 12 in the third pressing area 133 by electroplating, and the second convex blocks 22 are spaced from each other. A second receiving space B is defined between two adjacent second convex blocks 22. The first convex blocks 21 and the second convex blocks 22 form conductive convex blocks.

Figure 3:
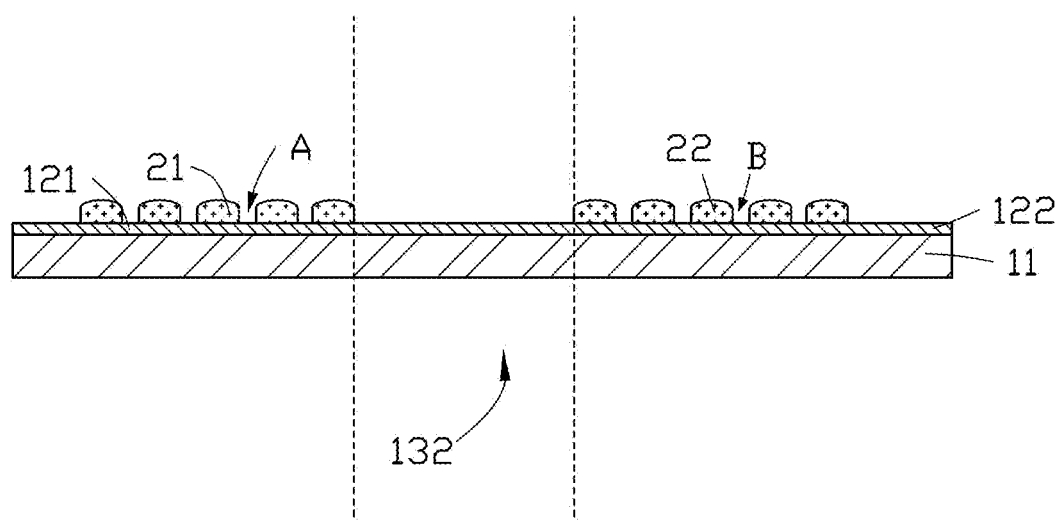
FIG. 3 is a diagrammatic view showing a copper foil layer of the copper-clad substrate of FIG. 2, with the copper-clad substrate partially removed.

At S3, referring to FIG. 3, the copper foil layer 12 in the second pressing area 132 is partially removed, so that the copper foil layer 12 in the first pressing area 131 forms a first conductive wiring 121, and the copper foil layer 12 in the third pressing area 133 forms a second conductive wiring 122. The first conductive wiring 121 and the second conductive wiring 122 cooperatively form a conductive wiring layer. The first convex block 21 is formed on the first conductive wiring 121, the second convex block 22 is formed on the second conductive wiring 122. The dielectric layer 11 is partially exposed from the second pressing area 132, so that the first conductive wiring 121 is electrically isolated from the second conductive wiring 122.

In other embodiments, after the copper foil layer 12 in the second pressing area 132 is partially removed, the first convex block 21 is formed on the first conductive wiring 121 by electroplating, and the second convex block 22 is formed on the second conductive wiring 122 by electroplating.

Figure 4:
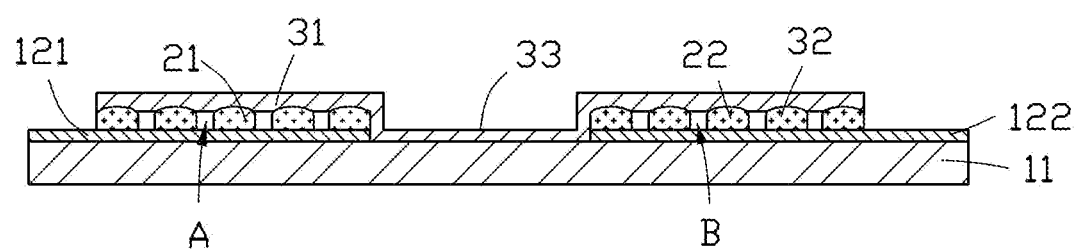
FIG. 4 is a diagrammatic view of a pressure-sensitive circuit board according to the first embodiment of the present application.

At S3, referring to FIG. 4, a first strain body 31 is formed on the first convex blocks 21, a second strain body 32 is formed on the second convex blocks 22, and a third strain body 33 is formed between the first strain body 31 and the third strain body 33. A portion of the third strain body 33 is formed on the dielectric layer 11. A remaining portion of the third strain body 33 may be formed on the sidewall of one first convex block 21 and the sidewall of the first conductive wiring 121. The remaining portion of the third strain body 33 may also be formed on the sidewall of one second convex block 22 and the sidewall of the second conductive wiring 122. Then, the pressure-sensitive circuit board 100 is obtained.

Figure 5:
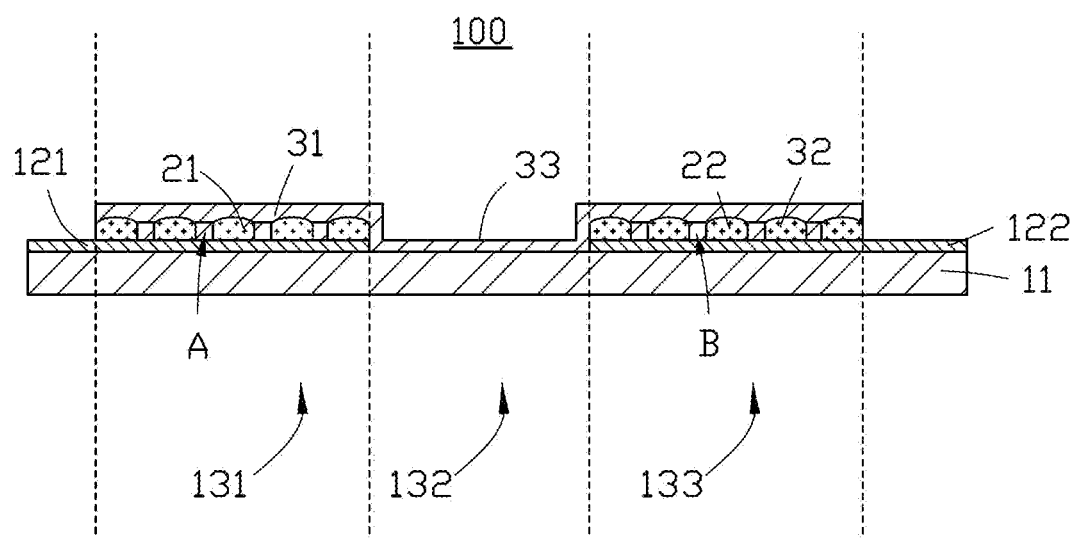
FIG. 5 is a diagrammatic view showing the pressure-sensitive circuit board of FIG. 4 being pressed.

Referring to FIG. 5, each of the first strain body 31, the second strain body 32, and the third strain body 33 may be elastically deformed under an external force. The resistances may also change. A portion of the deformed first strain body 31 may be filled in the first receiving space A, and a portion of the deformed second strain body 32 may be filled in the second receiving space B.

In one embodiment, each of the first strain body 31, the second strain body 32, and the third strain body 33 includes conductive particles and an adhesive. The conductive particles may include at least one of silver nanowires, silver nanopowders, and carbon, powders. The adhesive may include at least one of polydimethylsiloxane and thermoplastic polyurethane.

In one embodiment, the manufacturing method of the pressure-sensitive circuit board 100 further includes the following steps.

Figure 6:
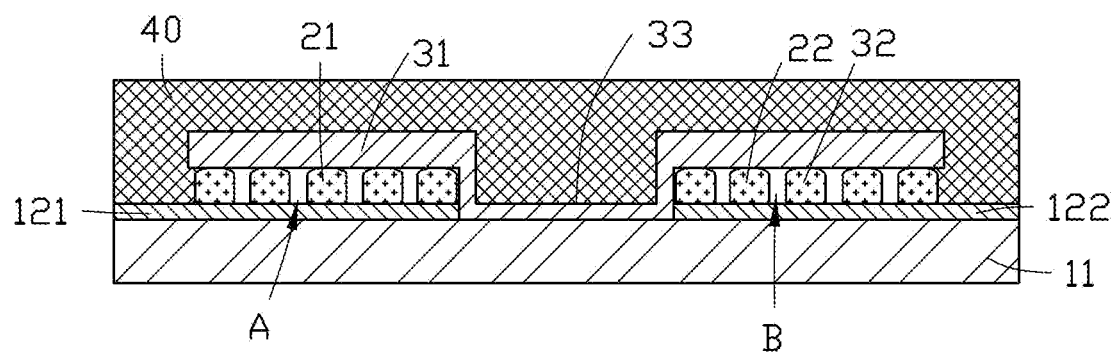
FIG. 6 is a diagrammatic view showing a first solder mask formed on the pressure-sensitive circuit board of FIG. 4.

At S4, referring to FIG. 6, a first solder mask 40 is formed on the first strain body 31, the second strain body 32, and the third strain body 33. The first solder mask 40 further covers the first conductive wiring 121 that is not covered by the first strain body 31 and the second conductive wiring 122 that is not covered by the second strain body 32.

Referring to FIG. 4, a pressure-sensitive circuit board 100 is provided by the first embodiment of the present application. The pressure-sensitive circuit board 100 includes a dielectric layer 11, a first conductive wiring 121, a second conductive wiring 122, a number of first convex blocks 21, a number of second convex blocks 22, a first strain body 31, a second strain body 32, and a third strain body 33. The first conductive wiring 121 and the second conductive wiring 122 are formed on the dielectric layer 11. The first conductive wiring 121 and the second conductive wiring 122 are spaced from each other. The first convex blocks 21 are formed on the first conductive wiring 121. The first convex blocks 21 are spaced from each other. A first receiving space A is defined between two adjacent first convex blocks 21. The second conductive blocks 22 are formed on the second conducting wiring 122. The second conductive blocks 22 are spaced from each other. A second receiving space B is defined between two adjacent second conductive blocks 22. The first strain body 31 is formed on the first convex blocks 21. Referring to FIG. 5, when the first strain body 31 is deformed, a portion of the first strain body 31 is filled in the first receiving space A. The second strain body 32 is formed on the second convex blocks 22. When the second strain body 32 is deformed, a portion of the second strain body 32 is filled into the second receiving space B. The third strain body 33 is connected between the first strain body 31 and the second strain body 32.

In one embodiment, each of the first convex blocks 21 and the second convex blocks 22 is substantially cylindrical. The first convex blocks 21 are formed on the first conductive wiring 121 in an array, and the second convex blocks 22 are formed on the second conductive wiring 122 in an array. A distance L between two adjacent first convex blocks 21 or between two adjacent second convex blocks 22 is in a range of 18 microns to 30 microns. Such distance L can match the deformation degrees of the first strain body 31 or the second strain body 32, thereby preventing a waste of space when the first receiving spaces A or the second receiving spaces B are too large, and also preventing overflow of the first strain body 31 or the second strain body 32 when the first receiving spaces A or the second receiving spaces B are too small.

Figure 7:
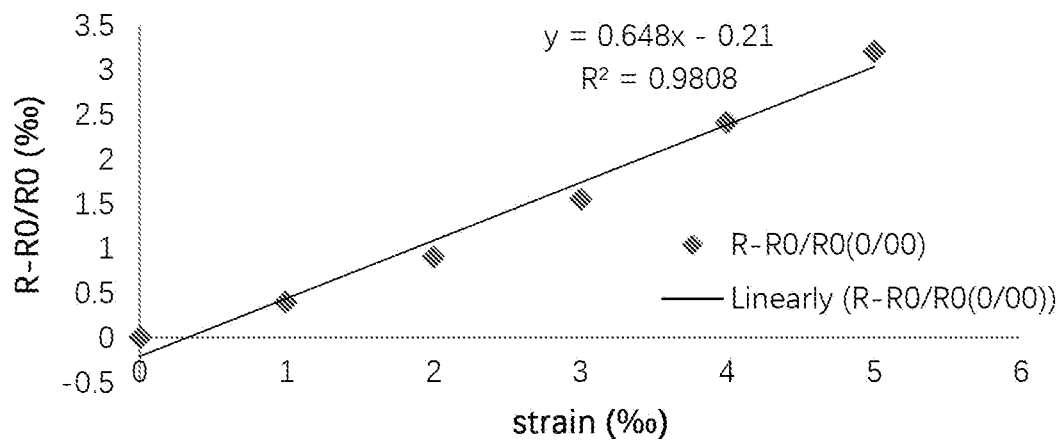
FIG. 7 is a diagrammatic view showing a relationship between change rates of resistances of a strain member in the pressure-sensitive circuit board of FIG. 4 and values of external forces.

Referring to FIG. 5, when the pressure-sensitive circuit board 100 is in used, the first conductive wiring 121 and the second conductive wiring 122 are both electrically connected to an external circuit (not shown) to form a closed circuit. When an external force is applied on the second pressing area 132, the third strain body 33 will generate a larger deformation degree. The first strain body 31 corresponding to the first pressing area 131 or the second strain body 32 corresponding to the third pressing area 133 will generate a smaller deformation degree. A portion of the deformed first strain body 31 is filled in the first receiving space A, and a portion of the deformed second strain body 32 is filled in the second receiving space B. At the same time, the space between two adjacent conductive particles in each of the first strain body 31, the second strain body 32, and the third strain body 33 will increase, resulting in an increase in the resistances of the first strain body 31, the second strain body 32, and the third strain body 33. Moreover, the resistance of the third strain body 33 with a larger deformation degree is greater than the resistance of the first strain body 31 or the second strain body 32 with a smaller deformation degree. The change of the resistances may be measured by an external circuit. Then, by applying external forces of different values to the pressing area 13, a number of change rates of resistances may be obtained, thereby obtaining a relationship between the change rates of resistances and the values of the external forces. Referring to FIG. 7, the value of ally external force may be measured according to the above one-to-one relationship and an actual change rate of resistances.

Compared to the existing arts, the pressure-sensitive circuit board 100 provided by the first embodiment of the present application has the following advantages.

(1) A number of first receiving spaces A are formed by setting the first convex blocks 21 spaced from each other, and a number of second receiving spaces B are formed by setting the second convex blocks 22 spaced from each other. The first receiving spaces A may receive a portion of the deformed first strain body 31. The second receiving spaces B may receive a portion of the deformed second strain body 32. That is, the deformed first strain body 31 may be separately filled in the first receiving spaces A, or the deformed second strain body 32 may be separately filled in the second receiving spaces B. Thus, the overall thickness of the pressure-sensitive circuit board 100 is reduced.

(2) By dividing the pressing area 13 into the second pressing area 132 and the first and third pressing areas 131, 133 located on both sides of the second pressing area 132, when the external force is applied on the pressing area 13, the third strain body 33 in the second pressing area 132 generates a larger deformation degree, and each of the first pressing area 131 and the third pressing area 133 generate a smaller deformation degree, which may increase the change rate of resistances and improve the sensitivity and accuracy of measurement results.

(3) Since a portion of the deformed first strain body 31 or a portion of the deformed second strain body 32 is received in the first receiving spaces A or the second receiving spaces B, respectively, the first strain body 31 or the second strain body 32 may be protected so that the first strain body 31 or the second strain body 32 may be rebound to the original state after the external force is removed. Also, the time when sudden changes of the resistance in the first strain body 31 or the third strain body 33 may be delayed. For example, when there is no first receiving space A to receive a portion of the deformed first strain body 31, the conductive particles inside the first strain body 31 may be easily separated from each other under the external force, resulting in a sudden change of the resistance.

Figure 8:
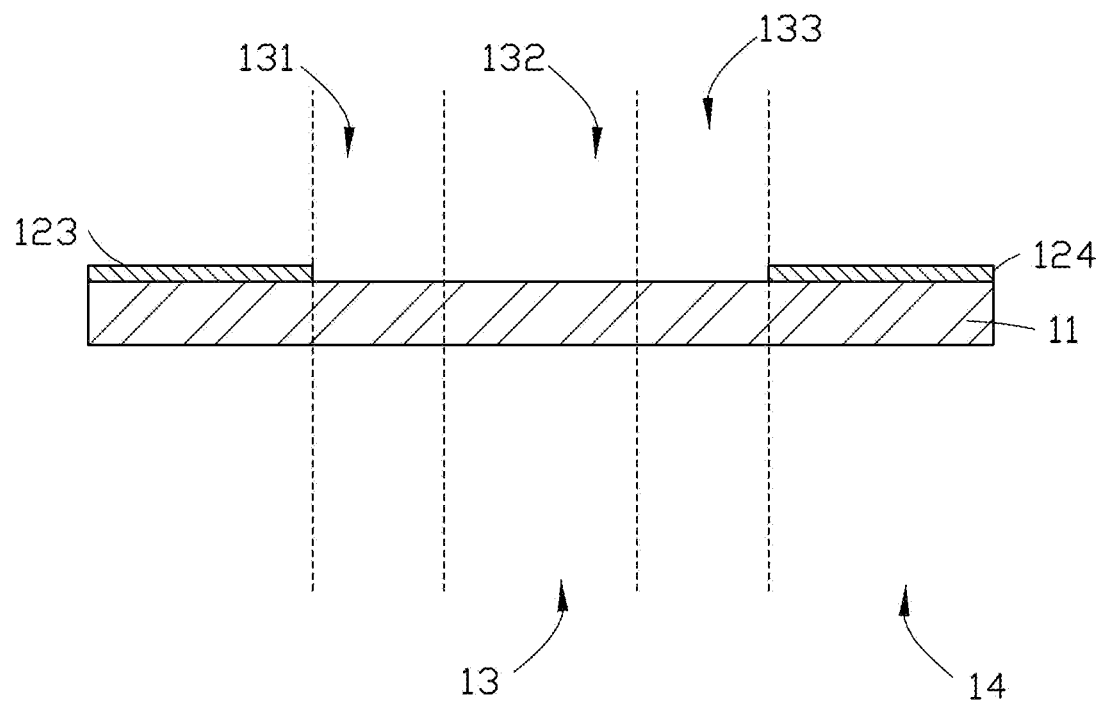
FIG. 8 is a diagrammatic view showing a copper foil layer of the second embodiment of the copper-clad substrate of FIG. 1, with the copper-clad substrate being partially removed.
Figure 12:
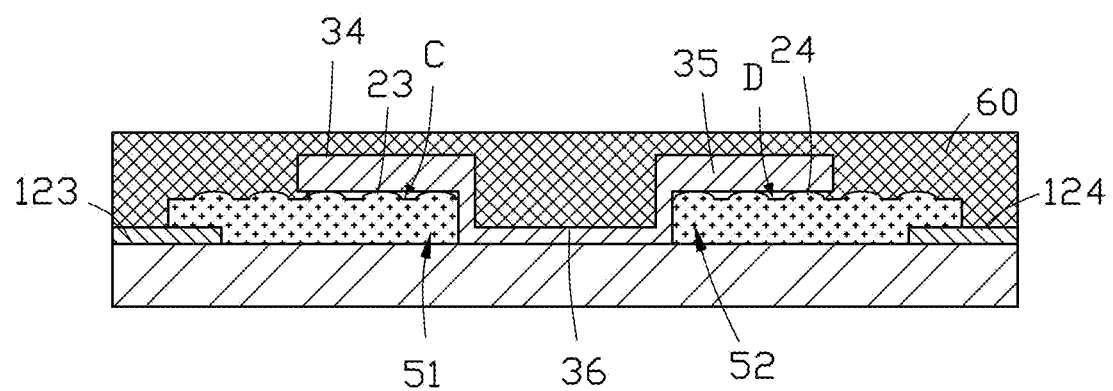
FIG. 12 is a diagrammatic view showing a second soler mask formed on the pressure-sensitive circuit board of FIG. 10.

Referring to FIGS. 1, 8, and 12, a manufacturing method for a pressure-sensitive circuit board 200 is also provided according to a second embodiment of the present application, which includes the following steps.

At S5, referring to FIG. 1, a copper-clad substrate 10 is provided. The copper-clad substrate 10 includes a dielectric layer 11 and a copper foil layer 12 formed on the dielectric layer 11. In an extension direction X of the copper-clad substrate 10, the copper-clad substrate 10 is divided into a pressing area 13 and a non-pressing area 14 besides the pressing area 13. The pressing area 13 is divided, into a first pressing area 131, a second pressing area 132, and a third pressing area 133 in the extension direction X. The second pressing area 132 is between the first pressing area 131 and the third pressing area 133.

At S6, referring to FIG. 8, the copper foil layer 12 in the pressing area 13 is removed to form a third conductive wiring 123 and a fourth conductive wiring 124. The dielectric layer 11 in the pressing area 13 is exposed between the third conductive wiring 123 and the fourth conductive wiring 124.

Figure 9:
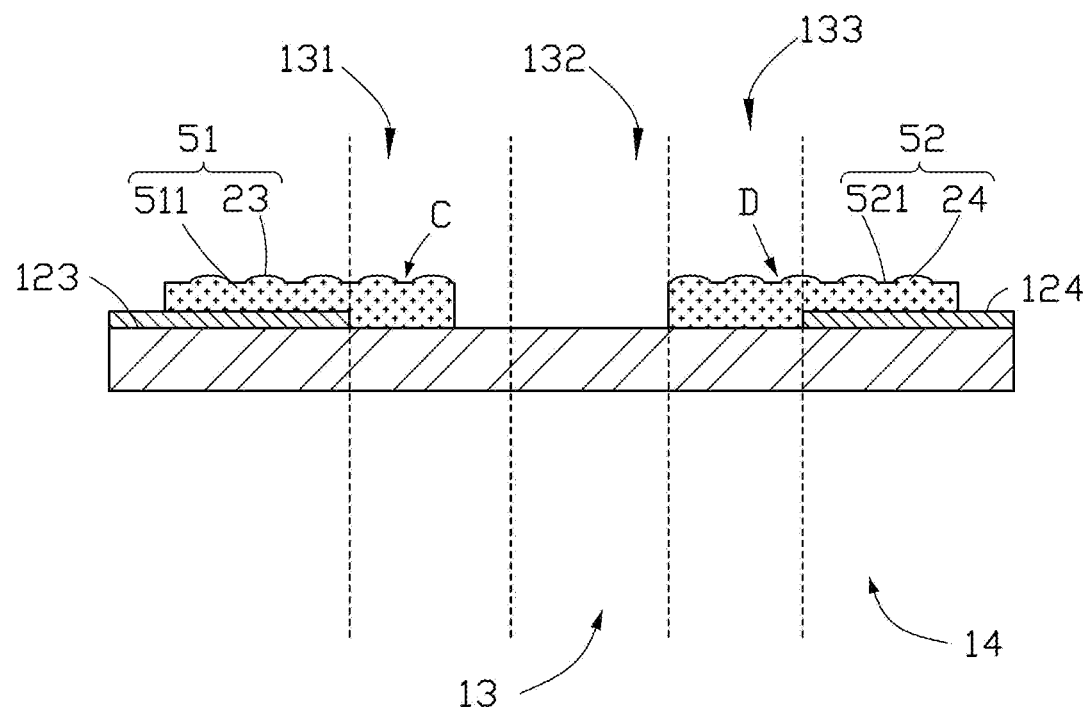
FIG. 9 is a cliagrammatic view showing a number of first conductive bodies and a number of second conductive bodies formed on the copper-clad substrate of FIG. 8.

At S7, referring to FIG. 9, a first conductive body 51 is formed on the first pressing area 131. The first conductive body 51 extends towards the third conductive wiring 123 and covers a portion of the third conductive wiring 123. The first conductive body 51 includes a first main body 511 and a number of third convex blocks 23 formed on the first main body 511. A third receiving space C is defined between two adjacent third convex blocks 23. A second conductive body 52 is formed the third pressing area 133. The second conductive body 52 extends towards the fourth conductive wiring 124 and covers a portion of the fourth conductive wiring 123. The second conductive body 52 includes a second main body 521 and a number of fourth convex blocks 24 formed on the second main body 521. A fourth receiving space D is defined between two adjacent fourth convex blocks 24. Each of the third convex blocks 23 and the fourth convex blocks 24 are substantially hemispherical. The third convex blocks 23 and the third convex blocks 24 are made of a same material that includes silver paste.

In one embodiment, the step S7 further includes pasting the silver paste on the first pressing area 131 and on a portion of the third conductive wiring 123, and solidifying the silver paste by heating, thereby obtaining the first conductive body 51; pasting the silver paste on the third pressing area 133 and on a portion of the fourth conductive wiring 123, and solidifying the silver paste by heating, thereby obtaining the second conductive body 52.

Figure 10:
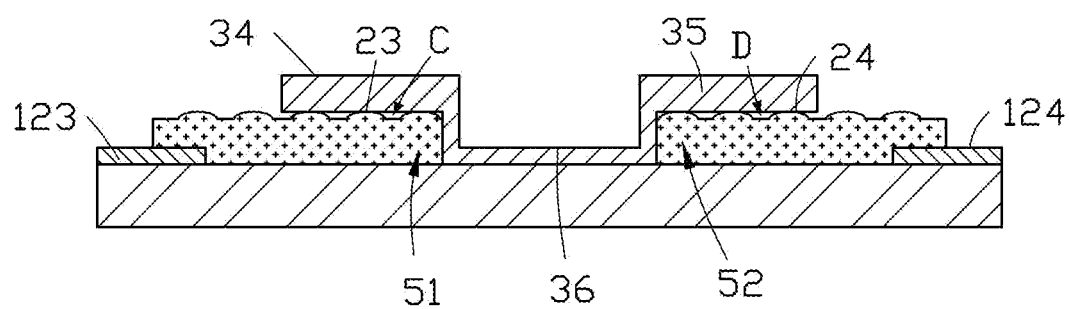
FIG. 10 is a diagrammatic view of a second embodiment of a pressure-sensitive circuit board of the present application.

At S9, referring to FIG. 10, a fourth strain body 34 is formed on the third convex blocks 23, a fifth strain body 35 is formed on the fourth convex blocks 24, and a sixth strain body 36 is formed between the fourth strain body 34 and the fifth strain body 35. A portion of the sixth strain body 36 is formed on the dielectric layer 11. A remaining portion of the sixth strain body 36 is formed on the sidewall of the first conductive body 51 or the sidewall of the second conductive body 52. The sixth strain body 36 electrically connects the fourth strain body 34 to the fifth strain body 35. Then, the pressure-sensitive circuit board 200 is obtained.

In one embodiment, the manufacturing method of the pressure-sensitive circuit board 200 further includes the following steps.

At S10, referring to FIG. 12, a second solder mask 60 is formed on the fourth strain body 34, the fifth strain body 35, and the sixth strain body 36.

Referring to FIG. 10, a pressure-sensitive circuit board 200 is provided according to the second embodiment of the present application. The pressure-sensitive circuit board 200 includes a dielectric layer 11, a third conductive wiring 123, a fourth conductive wiring 124, a first conductive body 51, a second conductive body 52, a fourth strain body 34, a fifth strain body 35, and a sixth strain body 36. The third conductive wiring 123 and the fourth conductive wiring 124 are formed on the dielectric layer 11. The third conductive wiring 123 and the fourth conductive wiring 124 are spaced from each other. The dielectric layer 11 is partially exposed between the third conductive wiring 123 and the fourth conductive wiring 124, The first conductive body 51 includes a first main body 511 and a number of third convex blocks 23 protruding from the first main body 511. The first main body 511 is formed on the third conductive wiring 123. A third receiving space C is defined between two adjacent third convex blocks 23. The second conductive body 52 includes a second main body 521 and a number of fourth convex blocks 24 protruding from the second main body 521. The second main body 521 is formed on the fourth conductive wiring 124. A fourth receiving space D is defined between two adjacent fourth convex blocks 24, The fourth strain body 34 is formed on the third convex blocks 23 to cover the third receiving spaces C. The fifth strain body 35 is formed on the fourth convex blocks 24 to cover the fourth receiving spaces D. The sixth strain body 36 is connected between the fourth strain body 34 and the fifth strain body 35. A portion of the sixth strain body 36 is formed on the dielectric layer 11 corresponding to the second pressing area 132.

In one embodiment, the third convex blocks 23 and the first main body 511 are formed by pasting in a single step. The fourth convex blocks 24 and the second main body 521 are also formed by pasting in a single step. Thus, the first and second conductive bodies 51, 52 with a uniform thickness may be formed.

Figure 11:
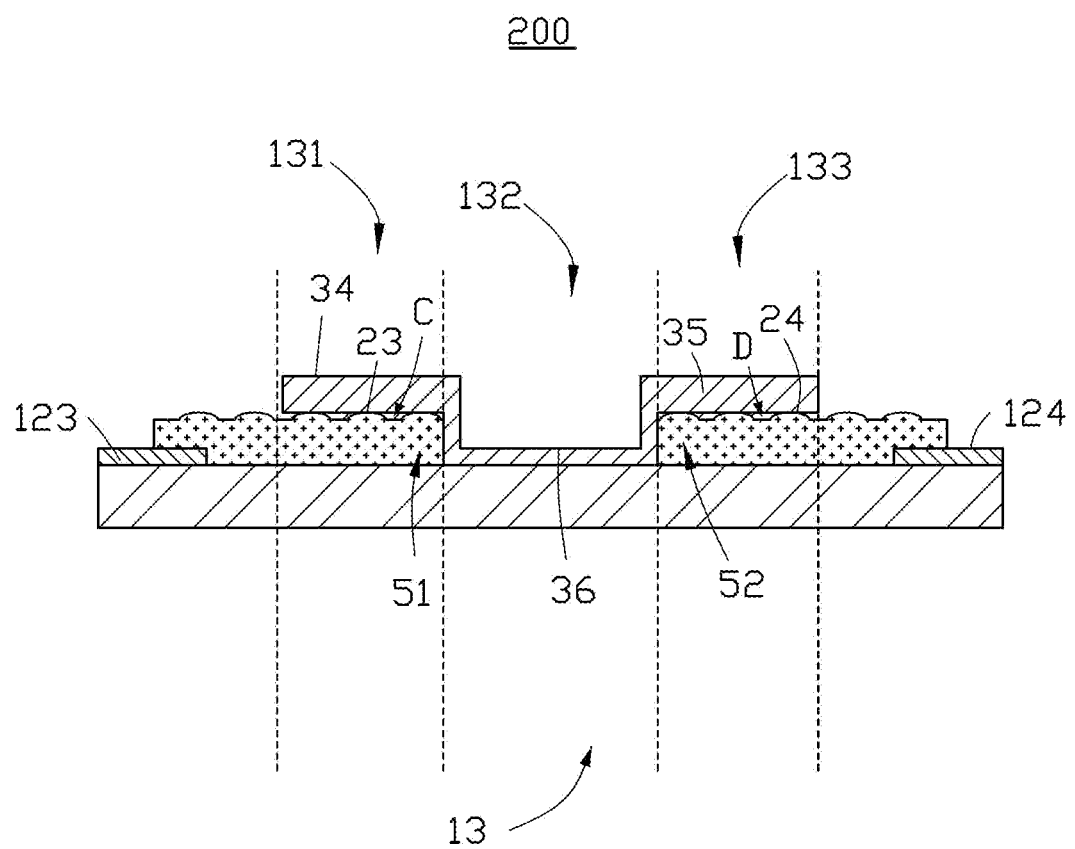
FIG. 11 is a diagrammatic view showing the pressure-sensitive circuit board of FIG. 10 being pressed.
Figure 13:
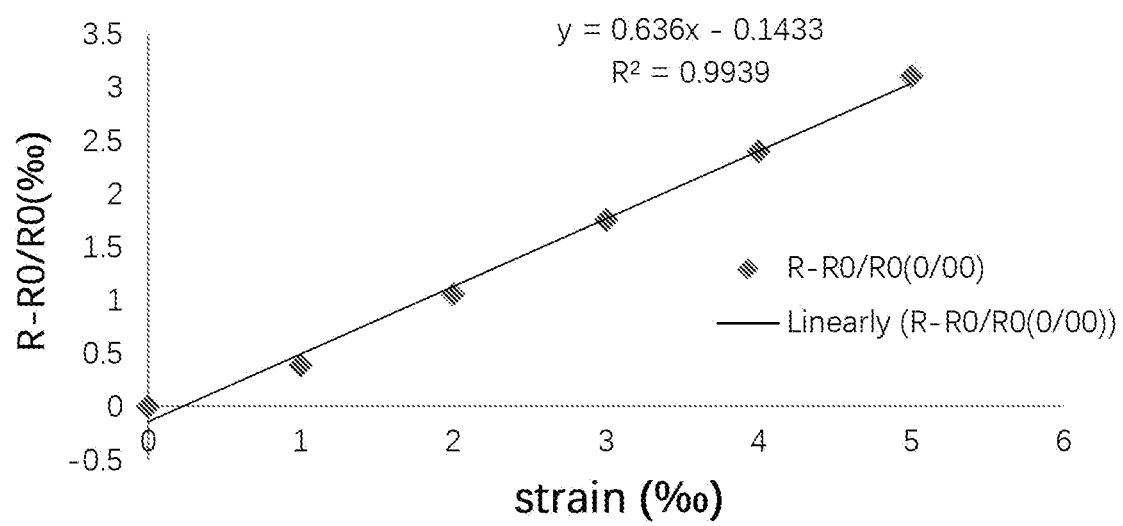
FIG. 13 is a diagrammatic view showing a relationship between change rates of resistances of a strain member in the pressure-sensitive circuit board of FIG. 10 and values of external forces.

Referring to FIG. 11, when the pressure-sensitive circuit board 200 is in used, the third conductive wiring 123 and the fourth conductive wiring 124 are connected to an external circuit (not shown) to form a closed circuit. When an external force is applied on the second pressing area 132, the sixth strain body 36 will generate a larger deformation degree, while each of the fourth strain body 34 corresponding to the first pressing area 131 or the fifth strain body 35 corresponding to the third pressing area 133 will generate a smaller deformation degree. A portion of the deformed fourth strain body 34 is filled in the third receiving spaces C. A portion of the deformed fifth strain body 35 is filled in the fourth receiving spaces D. At the same time, the resistances of the deformed fourth strain body 34, the deformed fifth strain body 35, and the deformed sixth strain body 36 may also increase, and the change rate of resistance of the deformed sixth strain body 36 with a larger deformation degree may be larger than the change rate of resistance of the deformed fourth strain body 34 or the deformed fifth strain body 35 with a smaller deformation degree. The change of the resistances may be measured by an external circuit. Then, by applying external forces of different values to the pressing area 13, a number of change rates of resistances may be obtained, thereby obtaining a relationship between the change rates of resistances and the values of the external forces. Referring to FIG. 13, the value of any external force may be measured according to the above one-to-one relationship and an actual change rate of resistances.

Figure 14:
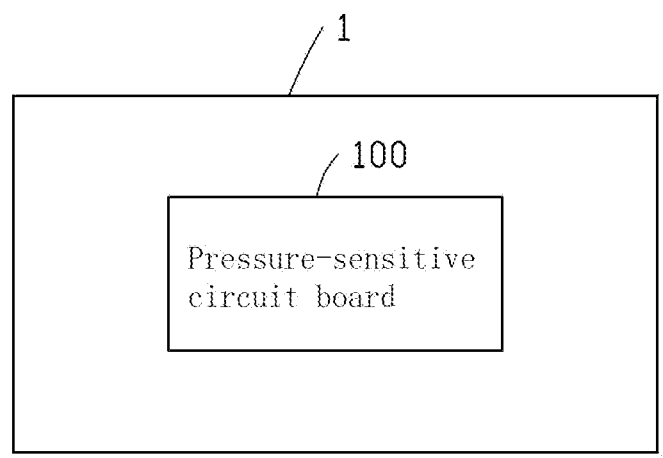
FIG. 14 is diagrammatic view of a pressure sensor according to an embodiment of the present application.

Referring to FIG. 14, a pressure sensor 1 is also provided by the present application. The pressure sensor 1 includes the above-mentioned pressure-sensitive circuit board 100 or 200, a measuring circuit (not shown), a processing chip (not shown), and a display. The pressure-sensitive circuit board 100 or 200 is electrically connected to the measuring circuit. The processing chip is electrically connected to the measuring circuit and the display. The measuring circuit is used to measure the actual change rate of resistances of the first strain body 31, the second strain body 32, and the third strain body 33 in the pressure-sensitive circuit board 100, or to measure the actual change rate of resistances of the fourth strain body 34, the fifth strain body 34, and the sixth strain body 36 in the pressure-sensitive circuit board 200. The measured change rate of resistances is transmitted to the processing chip. The processing chip pre-stores a relationship between the theoretical change rates of resistances and the values of the external forces. The processing chip calculates the actual value of the external force according to the one-to-one relationship and the actual change rate of resistance. The display is used to display the actual value of the external force.

The above embodiments are only used to illustrate but not to limit the technical solution of the present application. Although the present application has been described in detail with reference to the embodiments, one having ordinary skill in the art should understand that the technical solution of the present application can be modified or changed into equivalents, which still do not depart from the spirit and scope of the present application.

What is claimed is:

1. A pressure-sensitive circuit board comprising:
a circuit substrate;
a plurality of conductive convex blocks; and
a strain member,
wherein the circuit substrate comprises a dielectric layer and a conductive wiring layer formed on the dielectric layer, the plurality of conductive convex blocks is formed on the conductive wiring layer and spaced from each other, and a receiving space is defined between adjacent two of the plurality of conductive convex blocks, and
the strain member is formed on the plurality of conductive convex blocks and covers each of the receiving space, the strain member is deformable by an external force, and each of the receiving space is configured to receive at least a portion of the strain member when the stain member is deformed.

2. The pressure-sensitive circuit board according to claim 1, wherein the conductive wiring layer comprises a first conductive wiring and a second conductive wiring spaced from the first conductive wiring, the dielectric layer is partially exposed between the first conductive wiring and the second conductive wiring;
the plurality of conductive convex blocks comprises a plurality of first convex blocks and a plurality of second convex blocks, the plurality of first convex blocks are formed on the first conductive wiring and spaced from each other, the plurality of second convex blocks are formed on the second conductive wiring and spaced from each other; the receiving space comprises a first receiving space defined between adjacent two of the plurality of first convex blocks, and a second receiving space defined between adjacent two of the plurality of second convex blocks;
the strain member comprises a first strain body, a second strain body, and a third strain body, the first strain body is formed on the plurality of first convex blocks and covers each of the first receiving space, the second strain body is formed on the plurality of second convex blocks and covers each of the second receiving space, and the third second strain body is formed on the dielectric layer and connects the first strain body to the second strain body.

3. The pressure-sensitive circuit board according to claim 1, wherein the conductive wiring layer comprises a third conductive wiring and a fourth conductive wiring spaced from the third conductive wiring, the dielectric layer is partially exposed between the third conductive wiring and the fourth conductive wiring;
the plurality of conductive convex blocks comprises a first conductive body and a second conductive body, the first conductive body comprises a first main body and a plurality of third convex blocks protruding from the first main body, the second conductive body comprises a second main body and a plurality of fourth convex blocks protruding from the second main body, the first main body is formed on the third conductive wiring, the second main body is formed on the fourth conductive wiring, the receiving space comprises a third receiving space defined between adjacent two of the plurality of third convex blocks and a fourth receiving space defined between adjacent two of fourth convex blocks;
the strain member comprises a fourth strain body, a fifth strain body, and a sixth strain body, the fourth strain body is formed on the plurality of third convex blocks and covers each of the third receiving space, the fifth strain body is formed on the plurality of fourth convex blocks and covers each of the fourth receiving space, a portion of the sixth strain body is formed on the dielectric layer, and the sixth strain body connects the fourth strain body to the fifth strain body.

4. The pressure-sensitive circuit board according to claim 1, wherein a distance between adjacent two of the plurality of conductive convex blocks is in a range of 18 microns to 30 microns.

5. The pressure-sensitive circuit board according to claim 1, further comprising a solder mask formed on the strain member.

6. The pressure-sensitive circuit board according to claim 1, wherein the strain member comprises conductive particles and an adhesive, the conductive particles comprise at least one of silver nanowires, silver nanopowders, and carbon powders, and the adhesive comprises at least one of polydimethylsiloxane and thermoplastic polyurethane.

7. The pressure-sensitive circuit board according to claim 1, wherein the plurality of conductive convex blocks comprises metal or a composite of metal and adhesive.

8. A manufacturing method for a pressure-sensitive circuit board, comprising:
providing a circuit substrate, the circuit substrate being provided with a dielectric layer and a conductive wiring layer formed on the dielectric layer;
forming a plurality of conductive convex blocks on the conductive wiring layer, a receiving space being defined between adjacent two of the plurality of conductive convex blocks; and
forming a strain member on the plurality of conductive convex blocks, causing the strain member to cover each of the receiving space, thereby obtaining the pressure-sensitive circuit board.

9. The manufacturing method according to claim 8, wherein the plurality of conductive convex blocks is formed by electroplating or pasting of silver paste.

10. The manufacturing method of claim 8, wherein the conductive wiring layer is provided with a first conductive wiring and a second conductive wiring spaced from the first conductive wiring, and the dielectric layer is partially exposed between the first conductive wiring and the second conductive wiring;
wherein forming the plurality of conductive convex blocks on the conductive wiring layer further comprising:
forming a plurality of first convex blocks on the first conductive wiring; and
forming a plurality of second convex blocks on the second conductive wiring, wherein the receiving space defines a first receiving space between adjacent ones of the plurality of first convex blocks and a second receiving space between adjacent ones of the plurality of second convex blocks.

11. The manufacturing method of claim 10, wherein forming the strain member on the plurality of conductive convex blocks further comprising:
forming a first strain body on the plurality of first convex blocks, the first strain body covering each of the first receiving space;
forming a second strain body on the plurality of second convex blocks, the second strain body covering each of the second receiving space;
forming a third strain body the dielectric layer, the third strain body connecting the first strain body to the second strain body.

12. The manufacturing method of claim 8, wherein the conductive wiring layer is provided with a third conductive wiring and a fourth conductive wiring spaced from the third conductive wiring, the dielectric layer is partially exposed between the third conductive wiring and the fourth conductive wiring;
wherein forming the plurality of conductive convex blocks on the conductive wiring layer further comprising:
forming a first conductive body on the third conductive wiring, wherein the first conductive body is provided with a first main body and a plurality of third convex blocks protruding from the first main body;
forming a second conductive body on the fourth conductive wiring, wherein the second conductive body is provided with a second main body and a plurality of fourth convex blocks protruding from the second main body; the receiving space defines a third receiving space between adjacent ones of the plurality of third convex blocks and a fourth receiving space between adjacent ones of the plurality of fourth convex blocks.

13. The manufacturing method of claim 12, wherein forming the strain member on the plurality of conductive convex blocks further comprising:
forming a fourth strain body on the plurality of third convex blocks, the fourth strain body covering each of the third receiving space;
forming a fifth strain body on the plurality of fourth convex blocks, the fifth strain body covering each of the fourth receiving space; and
forming a sixth strain body on the dielectric layer, the sixth strain body connecting the fourth strain body to the fifth strain body.

14. A pressure sensor comprising:
a pressure-sensitive circuit board comprising:
a circuit substrate;
a plurality of conductive convex blocks; and
a strain member,
wherein the circuit substrate comprises a dielectric layer and a conductive wiring layer formed on the dielectric layer, the plurality of conductive convex blocks is formed on the conductive wiring layer and spaced from each other, and a receiving space is defined between adjacent two of the plurality of conductive convex blocks, and
the strain member is formed on the plurality of conductive convex blocks and covers each of the receiving space, the strain member is deformable by an external force, and each of the receiving space is configured to receive at least a portion of the strain member when the stain member is deformed.

15. The pressure sensor according to claim 14, wherein the conductive wiring layer comprises a first conductive wiring and a second conductive wiring spaced from the first conductive wiring, the dielectric layer is partially exposed between the first conductive wiring and the second conductive wiring;
the plurality of conductive convex blocks comprises a plurality of first convex blocks and a plurality of second convex blocks, the plurality of first convex blocks are formed on the first conductive wiring and spaced from each other, the plurality of second convex blocks are formed on the second conductive wiring and spaced from each other; the receiving space comprises a first receiving space defined between adjacent two of the plurality of first convex blocks, and a second receiving space defined between adjacent two of the plurality of second convex blocks; the strain member comprises a first strain body, a second strain body, and a third strain body, the first strain body is formed on the plurality of first convex blocks and covers each of the first receiving space, the second strain body is formed on the plurality of second convex blocks and covers each of the second receiving space, and the third strain body is formed on the dielectric layer and connects the first strain body to the second strain body.

16. The pressure sensor according to claim 14, wherein the conductive wiring layer comprises a third conductive wiring and a fourth conductive wiring spaced from the third conductive wiring, the dielectric layer is partially exposed between the third conductive wiring and the fourth conductive wiring;
the plurality of conductive convex blocks comprises a first conductive body and a second conductive body, the first conductive body comprises a first main body and a plurality of third convex blocks protruding from the first main body, the second conductive body comprises a second main body and a plurality of fourth convex blocks protruding from the second main body, the first main body is formed on the third conductive wiring, the second main body is formed on the fourth conductive wiring, the receiving space comprises a third receiving space defined between adjacent two of the plurality of third convex blocks and a fourth receiving space defined between adjacent two of the plurality of fourth convex blocks;

the strain member comprises a fourth strain body, a fifth strain body, and a sixth strain body, the fourth strain body is formed on the plurality of third convex blocks and covers each of the third receiving space, the fifth strain body is formed on the plurality of fourth convex blocks and covers each of the fourth receiving space, a portion of the sixth strain body is formed on the dielectric layer, and the sixth strain body connects the fourth strain body to the fifth strain body.

17. The pressure sensor according to claim 14, wherein a distance between adjacent two of the plurality of conductive convex blocks is in a range of 18 microns to 30 microns.

18. The pressure sensor according to claim 14, wherein the pressure-sensitive circuit board further comprises a solder mask formed on the strain member.

19. The pressure sensor according to claim 14, wherein the strain member comprises conductive particles and an adhesive, the conductive particles comprise at least one of at least one of silver nanowires, silver nanopowders, and carbon powders, and the adhesive comprises at least one of polydimethylsiloxane and thermoplastic polyurethane.

20. The pressure sensor according to claim 14, wherein the plurality of conductive convex blocks comprises metal or a composite of metal and adhesive.

\* \* \* \* \*